(12) United States Patent
Li et al.

(10) Patent No.: US 11,711,706 B2
(45) Date of Patent: Jul. 25, 2023

(54) COMMUNICATION CONFIGURATION SELECTION

(71) Applicant: Motorola Mobility LLC, Chicago, IL (US)

(72) Inventors: Hongchao Li, Beijing (CN); Xiaodong Yu, Beijing (CN); Haipeng Lei, Beijing (CN); Chenxi Zhu, Fairfax, VA (US)

(73) Assignee: Motorola Mobility LLC, Chicago, IL (US)

( * ) Notice: Subject to any disclaimer, the term of this patent is extended or adjusted under 35 U.S.C. 154(b) by 192 days.

(21) Appl. No.: 17/356,350

(22) Filed: Jun. 23, 2021

(65) Prior Publication Data

US 2021/0321270 A1 Oct. 14, 2021

Related U.S. Application Data

(63) Continuation of application No. 16/475,295, filed as application No. PCT/CN2016/113734 on Dec. 30, 2016, now Pat. No. 11,076,304.

(51) Int. Cl.
*H04W 24/02* (2009.01)
*H04W 8/24* (2009.01)

(52) U.S. Cl.
CPC .......... *H04W 24/02* (2013.01); *H04W 8/245* (2013.01)

(58) Field of Classification Search
CPC ....... H04W 24/02; H04W 8/245; H04W 4/50; H04W 28/18; H04L 27/26025;
(Continued)

(56) References Cited

U.S. PATENT DOCUMENTS 11,544,313 B2 * 1/2023 Klein, Jr. ............. H04L 65/762
2003/0134629 A1 * 7/2003 Ollis ..................... H04W 4/06
455/418

(Continued)

FOREIGN PATENT DOCUMENTS

CN 102291804 A 12/2011
CN 102573072 A 7/2012
(Continued)

OTHER PUBLICATIONS

Huawei, Hisilicon, "WF on URLLC evaluation parameter and LLS method", 3GPP TSG RAN WG1 Meeting #86 R1-168371, Aug. 22-26, 2016, pp. 1-6.
(Continued)

*Primary Examiner* — Ankur Jain
(74) *Attorney, Agent, or Firm* — Kunzler Bean & Adamson

(57) ABSTRACT

Apparatuses, methods, and systems are disclosed for communication configuration selection. One apparatus includes a receiver that receives configuration information for multiple communication configurations. The configuration information corresponds to services having different performance requirements, and the performance requirements include latency, reliability, peak data rate, efficiency overhead, control overhead, system capacity, or some combination thereof. The apparatus also includes a processor that
(Continued)

selects a communication configuration of the multiple communication configurations. The apparatus communicates using the selected communication configuration.

20 Claims, 7 Drawing Sheets

(58) Field of Classification Search
CPC . H04L 27/2607; H04L 27/261; H04L 5/0064; H04L 5/0094; H04L 27/2646; H04L 41/5087; H04L 41/5048; H04L 41/5054
See application file for complete search history.

(56) References Cited

U.S. PATENT DOCUMENTS

2013/0235787 A1* 9/2013 Lin ....................... H04L 65/611
370/312
2018/0115440 A1* 4/2018 Song ................. H04L 25/03318

FOREIGN PATENT DOCUMENTS

| CN | 102685908 A | 9/2012 |
|---|---|---|
| WO | 2011/009271 A1 | 1/2011 |

OTHER PUBLICATIONS

CMCC, "Discussion on Multiple Access Schemes for URLLC", 3GPP TSG RAN WG1 Meeting #86bis R1-1609300, Oct. 10-14, 2016, pp. 1-4.
CATR, "Discussion on non-orthogonal multiple access for URLLC usage scenario", 3GPP TSG RAN WG1 Meeting #86bis R1-1609580, Oct. 10-14, 2016, pp. 1-5.
Sony, "Multiplexing eMBB and URLLC Transmissions", 3GPP TSG RAN WG1 Meeting #86bis R1-1608942, Oct. 10-14, 2016, pp. 1-4.
Samsung, "Numerology for URLLC", 3GPP TSG RAN WG1 Meeting #86bis R1-1609050, Oct. 10-14, 2016, pp. 1-4.
3GPP, "3rd Generation Partnership Project; Technical Specification Group Radio Access Network; Study on Scenarios and Requirements for Next Generation Access Technologies; (Release 14)", 3GPP TR 38.913 V0.4.0, Jun. 2016, pp. 1-35.
Huawei, Hisilicon, "Support of URLLC in DL", 3GPP TSG RAN WG1 Meeting #8 6bis R1-1608844, Oct. 10-14, 2016, pp. 1-6.
INTEL Corporation, "On URLLC mini-slot structure", 3GPP TSG RAN WG1 Meeting #86bis R1-1609510, Oct. 10-14, 2016, pp. 1-5.
QUALCOMM Incorporated, "URLLC numerology and frame structure design", 3GPP TSG-RAN WG1 #86bis R1-1610123, Oct. 10-14, 2016, pp. 1-10.

* cited by examiner

COMMUNICATION CONFIGURATION SELECTION

CROSS REFERENCE TO RELATED APPLICATIONS

This application is a continuation of application Ser. No. 16/475,295 filed on Jul. 1, 2019, which is hereby incorporated by reference in its entirety.

FIELD

The subject matter disclosed herein relates generally to wireless communications and more particularly relates to communication configuration selection.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, URLLC may have a data payload that is small. According to some circumstances, URLLC may have a periodically occurring packet arrival rate and a packet size may be 32 bytes, 50 bytes, 200 bytes, and so forth. In some other circumstances, URLLC may have sporadically occurring packets with large or small packet size.

In certain configurations, for URLLC, the user plane latency may be 0.5 ms for UL, and 0.5 ms for DL. Moreover, URLLC reliability may be evaluated by a success probability of transmitting X bytes within 1 ms. This may be the time it takes to deliver a small data packet from the radio protocol layer 2/3 service data unit ("SDU") ingress point to the radio protocol layer 2/3 SDU egress point of the radio interface, at a certain channel quality (e.g., coverage-edge). In various configurations, the target for reliability may be $1\text{-}10^{-5}$ within 1 ms. In certain configurations, a general URLLC reliability requirement for one transmission of a packet may be 1-10−5 for X bytes (e.g., 20 bytes) with a user plane latency of 1 ms.

BRIEF SUMMARY

Apparatuses for communication configuration selection are disclosed. Methods and systems also perform the functions of the apparatus. In one embodiment, the apparatus includes a receiver that receives configuration information for multiple communication configurations. In various embodiments, the configuration information corresponds to services having different performance requirements, and the performance requirements include latency, reliability, peak data rate, efficiency overhead, control overhead, system capacity, or some combination thereof. The apparatus also includes a processor that selects a communication configuration of the multiple communication configurations. In certain embodiments, the apparatus communicates using the selected communication configuration.

In one embodiment, the resource granularity configuration information includes a time duration, a frequency bandwidth, a subcarrier spacing, a waveform, a reference signal pattern, a cyclic prefix overhead setting, or some combination thereof for each communication configuration of the multiple communication configurations. In a further embodiment, the receiver receives the configuration information via signaling. In certain embodiments, the receiver receives resource information corresponding to the communication configuration. In some embodiments, the multiple communication configurations include communication configurations selected from the group including enhanced mobile broad band, ultra reliable and low latency communication, and massive machine type communication.

In various embodiments, the receiver receives selection information via signaling for selecting the communication configuration. In some embodiments, the processor dynamically selects the communication configuration. In one embodiment, the communication configuration includes an uplink communication configuration corresponding to an uplink control channel, an uplink data channel, or some combination thereof. In a further embodiment, the communication configuration includes a downlink communication configuration corresponding to a downlink control channel, a downlink data channel, or some combination thereof. In various embodiments, the configuration information includes a resource allocation configuration, a transmission mode configuration, or some combination thereof.

A method for communication configuration selection, in one embodiment, includes receiving configuration information for multiple communication configurations. In certain embodiments, the configuration information corresponds to services having different performance requirements, and the performance requirements include latency, reliability, peak data rate, efficiency overhead, control overhead, system capacity, or some combination thereof. The method also includes selecting a communication configuration of the multiple communication configurations. The method includes communicating data using the selected communication configuration.

In one embodiment, an apparatus includes a transmitter that transmits configuration information for multiple communication configurations. In various embodiments, the apparatus communicates data using a selected communication configuration of the multiple communication configurations, the configuration information corresponds to services having different performance requirements, and the performance requirements include latency, reliability, peak data rate, efficiency overhead, control overhead, system capacity, or some combination thereof.

In one embodiment, the configuration information includes a time duration, a frequency bandwidth, a subcarrier spacing, a waveform, a reference signal pattern, a cyclic prefix overhead setting, or some combination thereof for each communication configuration of the multiple communication configurations. In a further embodiment, the transmitter transmits the configuration information via signaling. In certain embodiments, the transmitter transmits resource information corresponding to the communication configuration. In some embodiments, the multiple communication configurations include communication configurations selected from the group including enhanced mobile broad band, ultra reliable and low latency communication, and massive machine type communication.

In various embodiments, the apparatus includes a processor that selects the selected communication configuration. In some embodiments, the transmitter transmits information indicating the selected communication configuration. In one embodiment, the communication configuration includes an uplink communication configuration corresponding to an uplink control channel, an uplink data channel, or some combination thereof. In a further embodiment, the communication configuration includes a downlink communication configuration corresponding to a downlink control channel, a downlink data channel, or some combination thereof. In various embodiments, the configuration information includes a resource allocation configuration, a transmission mode configuration, or some combination thereof.

A method for communication configuration selection, in one embodiment, includes transmitting configuration information for multiple communication configurations. In certain embodiments, the configuration information corresponds to services having different performance requirements, and the performance requirements include latency, reliability, peak data rate, efficiency overhead, control overhead, system capacity, or some combination thereof. The method also includes communicating data using a selected communication configuration of the multiple communication configurations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
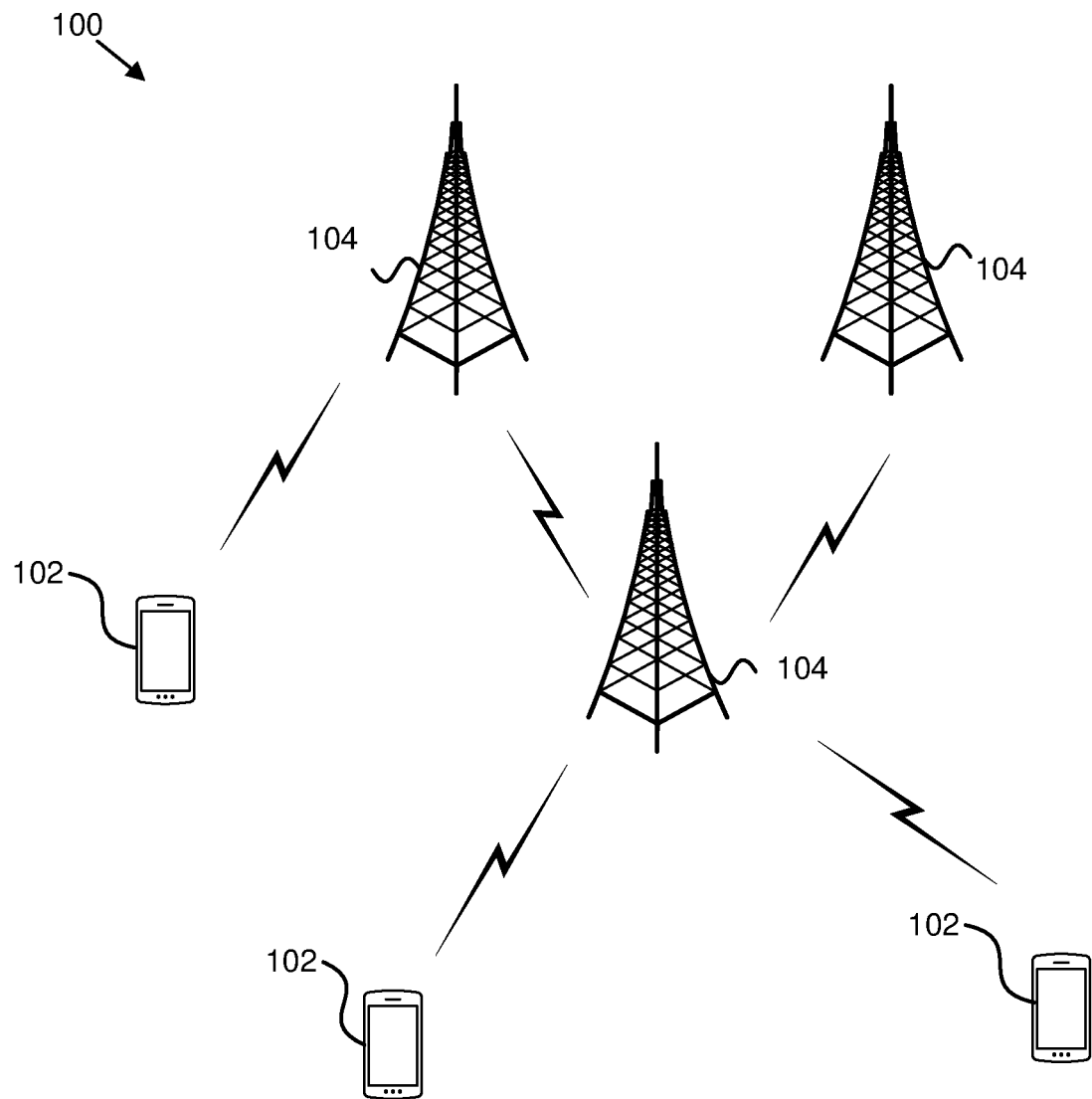
FIG. 1 is a schematic block diagram illustrating one embodiment of a wireless communication system for communication configuration selection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for communication configuration selection. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may transmit configuration information for multiple communication configurations. The configuration information may correspond to services having different performance requirements, and the performance requirements may include latency, reliability, peak data rate, efficiency overhead, control overhead, system capacity, or some combination thereof. In some embodiments, the base unit 104 may communicate data using a selected communication configuration of the multiple communication configurations. Accordingly, a base unit 104 may be used for communication configuration to selection.

In another embodiment, a remote unit 102 may receive configuration information for multiple communication configurations. The configuration information may correspond to services having different performance requirements, and the performance requirements may include latency, reliability, peak data rate, efficiency overhead, control overhead, system capacity, or some combination thereof. The remote unit 102 may select a communication configuration of the multiple communication configurations. The remote unit 102 may communicate data using the selected communication configuration. Accordingly, a remote unit 102 may be used for communication configuration selection.

Figure 2:
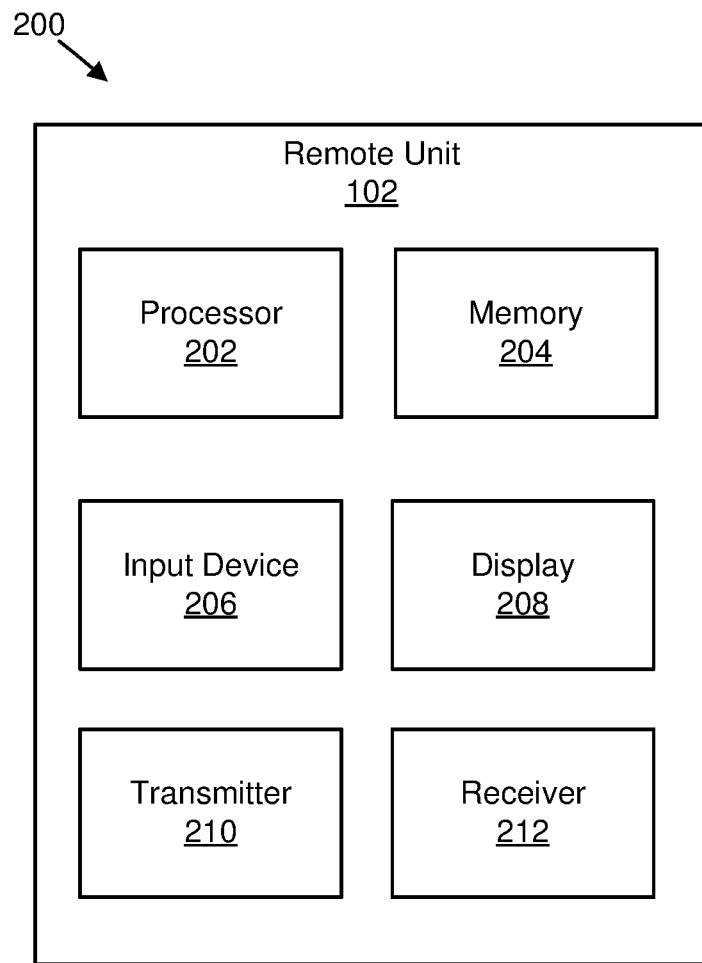
FIG. 2 is a schematic block diagram illustrating one embodiment of an apparatus that may be used for communication configuration selection.

FIG. 2 depicts one embodiment of an apparatus 200 that may be used for communication configuration selection. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may select a communication configuration of multiple communication configurations. In various embodiments, the processor 202 facilitates communication using the selected communication configuration. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to communication configurations. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the receiver 212 may be used to receive configuration information for multiple communication configurations. The configuration information may correspond to services having different performance requirements, and the performance requirements may include latency, reliability, peak data rate, efficiency overhead, control overhead, system capacity, or some combination thereof. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
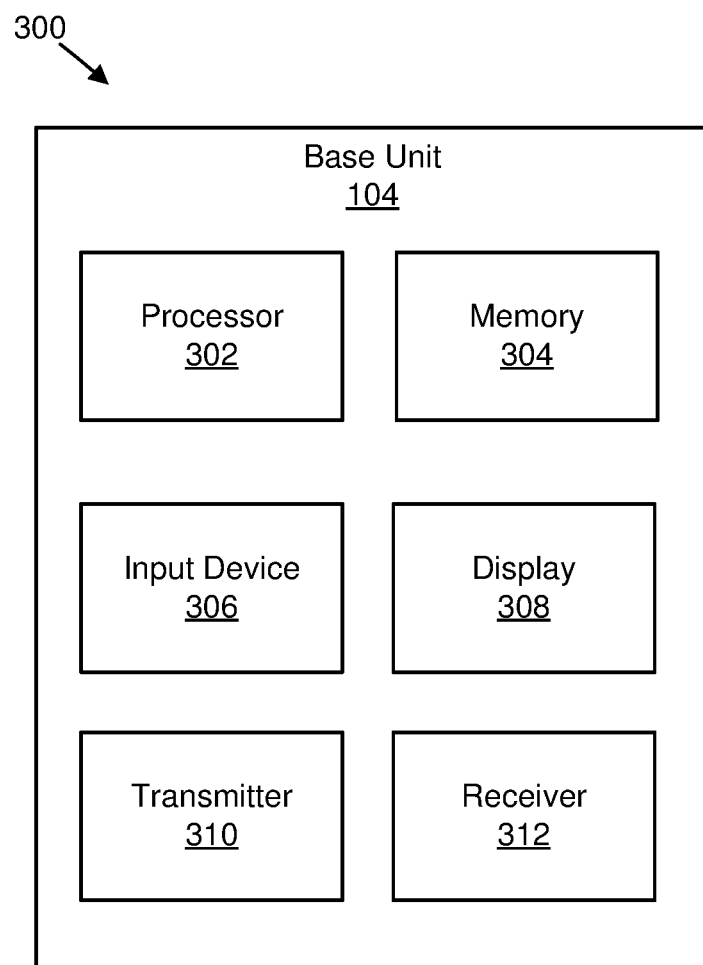
FIG. 3 is a schematic block diagram illustrating one embodiment of an apparatus that may be used for communication configuration selection.

FIG. 3 depicts one embodiment of an apparatus 300 that may be used for communication configuration selection. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiment, the transmitter 310 is used to transmit configuration information for multiple communication configurations. In some embodiments, the configuration information corresponds to services having different performance requirements, and the performance requirements may include latency, reliability, peak data rate, efficiency overhead, control overhead, system capacity, or some combination thereof. In certain embodiments, the processor 302 may facilitate communicating data using a selected communication configuration of the multiple communication configurations. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
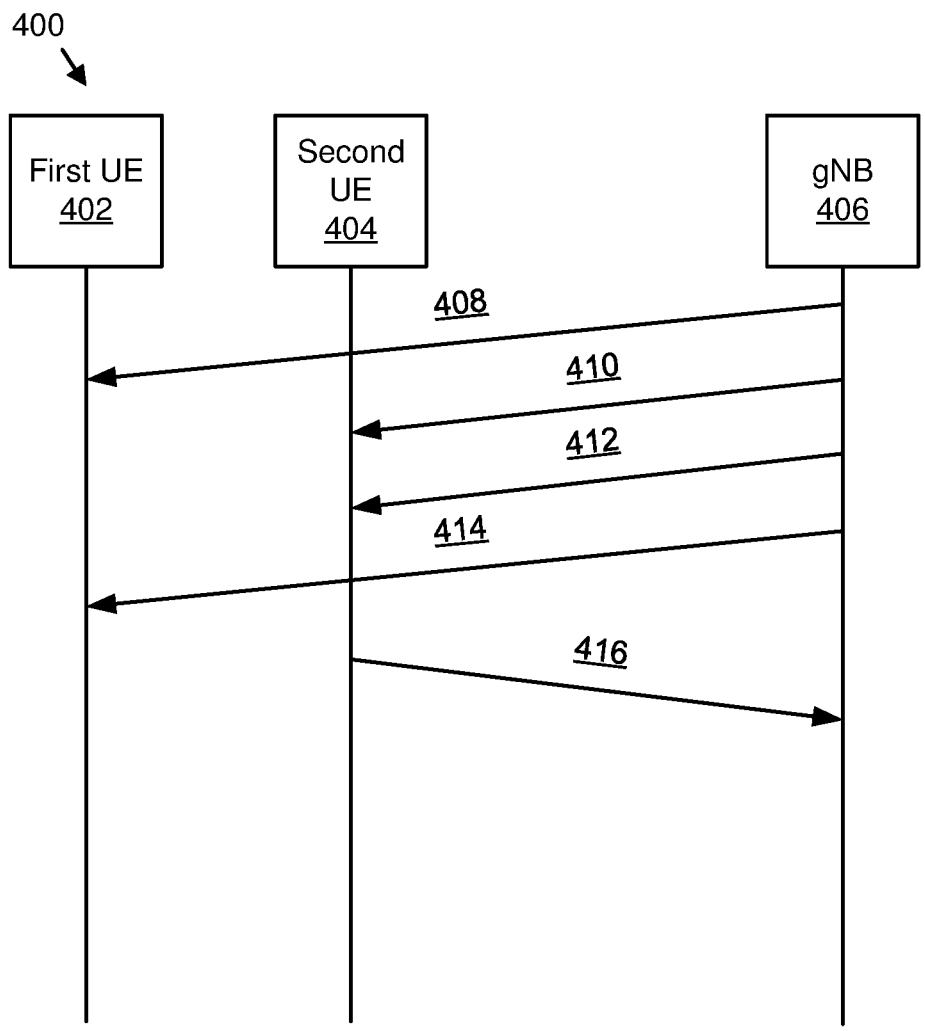
FIG. 4 illustrates one embodiment of communications for communication configuration selection.

FIG. 4 illustrates one embodiment of communications 400 for communication configuration selection. Specifically, communications 400 between a first UE 402, a second UE 404, and a gNB 406 are illustrated. The communications 400 may facilitate flexibly scheduling eMBB and URLLC. To facilitate flexibly scheduling eMBB and URLLC, a flexible resource granularity shaping indication and/or configuration mechanism may be used.

In one embodiment, a set of usable resource granularities may be configured to the first UE 402 and/or the second UE 404 (and/or other UEs) via RRC signaling. The resource granularity candidates may provide multiple options which may have a minimum scheduling granularity. Each resource granularity candidate may be represented by a time domain length (e.g. M OFDM symbols, X ms, X us, etc.) and/or a frequency domain bandwidth (e.g. N subcarriers, etc.). In some embodiments, the resource granularity candidates may include a limited set of options for a network to choose based on use cases and/or services that are currently running and/or may be operating. In various embodiments, certain corresponding desirable performance requirements may be considered.

In certain embodiments, a resource granularity candidate may be associated with a waveform (e.g., CP-OFDM, SC-FDMA), numerology, and/or CP length setting, each of which may be a default (e.g., as used by a synchronization signal block, a primary synchronization signal block, a secondary synchronization signal, and so forth), a scaled setting, and/or a configurable setting.

In one embodiment, each resource granularity candidate may include a reference signal pattern based on a shaping and/or a targeted application scenario (e.g., large blocks of resources may be used to schedule eMBB traffic, one symbol scheduling/triggering may be used for URLLC traffic, single-tone scheduling may be used for coverage enhancement and low cost mMTC UEs for a specific MIMO scheme).

In various embodiments, the resource granularity candidate may be used to indicate: a DL control channel resource subset for a certain UE; a DL data channel resource location for a certain UE; an UL data channel resource location for a certain UE; an UL control channel resource location for a certain UE; and/or a minimum resource unit containing a UL grant-free transmission within or without a resource pool constraint. In some embodiments, at least one of the resource granularity candidates may support a spreading/ interleaving-based NOMA scheme.

In various embodiments, a resource granularity candidate that is used for a certain channel or transmission may be dynamically indicated, selected, and/or changed by physical control signaling (e.g., DCI) and/or may be semi-statically configured via a broadcast message, a common channel, and/or common signaling. In one embodiment, based on the resource granularity candidate to be used, the gNB 406 may efficiently schedule a transport block or coding blocks to appropriate physical resources.

In certain embodiments, UL URLLC may be based on grant-free transmission and may be configured with a resource that may be selectively scheduled to UL eMBB transmission. Thus, the resource allocation for grant-free transmission may employ a granularity shaping framework that facilitates introducing less impact to eMBB. In various embodiments, a resource granularity candidate used by URLLC may be smaller than that used by one coding block ("CB") of eMBB as illustrated by FIG. 5.

Figure 5:
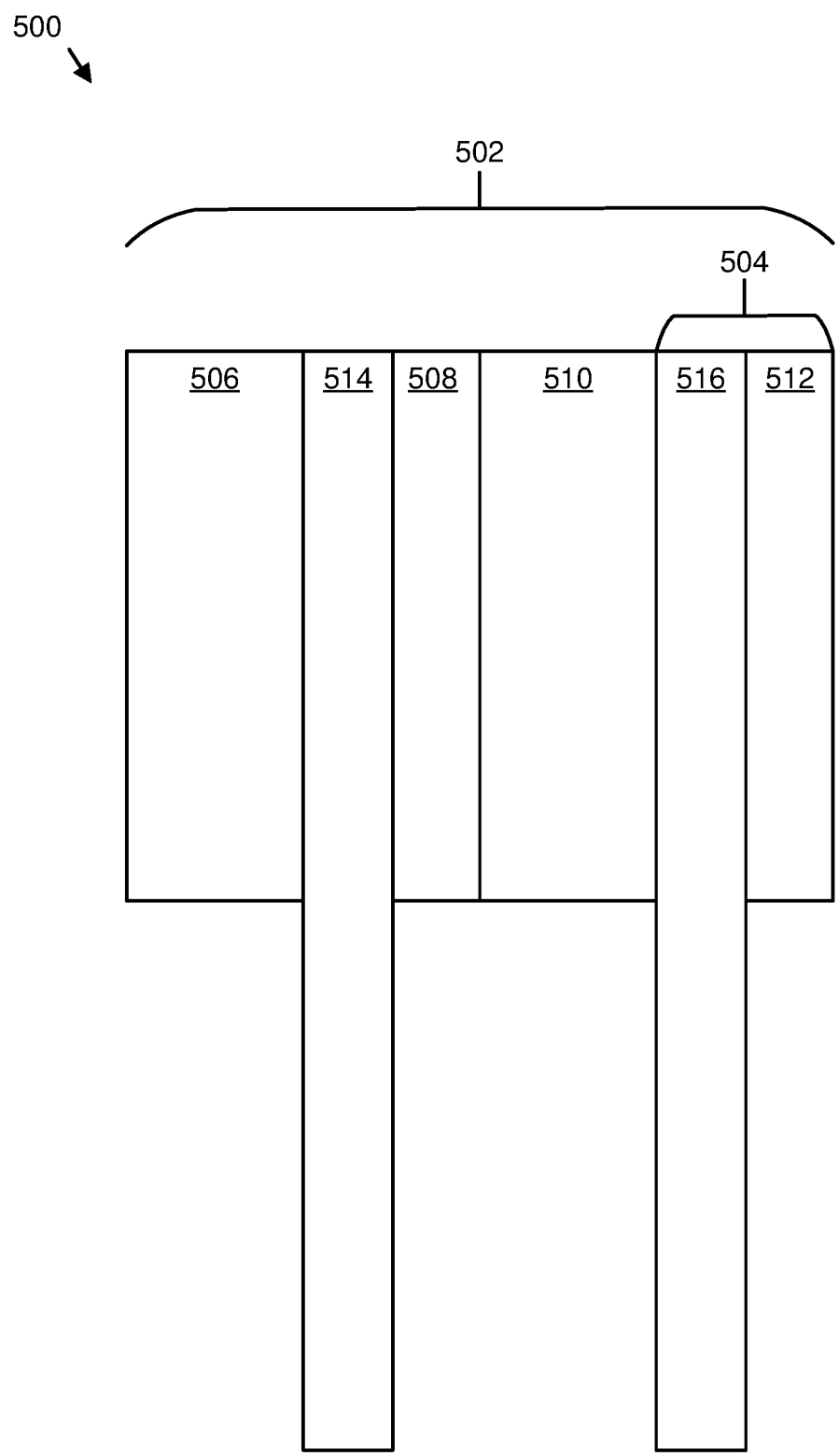
FIG. 5 is a schematic block diagram illustrating one embodiment of communications for communication configuration selection.

Turning to FIG. 5, a schematic block diagram illustrating one embodiment of communications 500 for communication configuration selection is shown. Specifically, the communications 500 include an eMBB TB 502 that includes four eMBB CBs 504. Indeed, the eMBB TB 502 includes a first eMBB CB 506, a second eMBB CB 508, a third eMBB CB 510, and a fourth eMBB CB 512. Moreover, a first URLLC communication 514 is multiplexed with the second eMBB CB 508, and a second URLLC communication 516 is multiplexed with the fourth eMBB CB 512.

Returning to FIG. 4, a first communication 408 may include a message sent from the gNB 406 to the first UE 402 indicating one or more resource granularity candidates (e.g., such as the resource granularity candidates shown in Table 1), such as via RRC signaling. Moreover, a second communication 410 may include a message sent from the gNB 406 to the second UE 404 indicating the one or more resource granularity candidates (e.g., such as the resource granularity candidates shown in Table 1), such as via RRC signaling.

TABLE 1

| Granularity Shaping Index | Time Domain Duration | Frequency Domain Bandwidth | Subcarrier Spacing | Waveform |
| --- | --- | --- | --- | --- |
| 00 | 7 OFDM Symbols | 12 Subcarriers | 15 kHz | OFDM |
| 01 | 1 OFDM Symbol | 168 Subcarriers | 30 kHz | OFDM |
| 10 | 168 Symbols | 1 Subcarrier | 15 kHz | Single-Tone |
| 11 | 2 Symbols | 42 Subcarriers | 15 kHz | DFTS-OFDM |

In one embodiment, the gNB 406 may configure available resource granularity candidates based on the service types that are and/or will be used. For example, the granularity shaping index '00' may be used for generic eMBB traffic scheduling; the granularity shaping index '01' may be used for URLLC traffic scheduling and/or grant-free transmission as possessing short transmission duration; the granularity shaping index '10' may be used by mMTC because of its single carrier property and because coverage enhancement may be achieved by using high power density; the granularity shaping index '11' may be used for more balanced granularity shaping with the DFTS-OFDM waveform (e.g., which may be used for both eMBB and URLLC services and some coverage limited use cases).

A third communication 412 may include a message transmitted from the gNB 406 to the second UE 404 to indicate to the second UE 404 usable UL grant-free transmission opportunities for URLLC traffic. The indication may include a minimum resource granularity (e.g., granularity shaping index '01'), and allowed resource mapping positions. In various embodiments, a resource granularity candidate used by URLLC may be smaller than that used by one coding block ("CB") of eMBB. In some embodiments, a URLLC transmission opportunity may avoid overlapping with the RS used by eMBB transmission. In the present embodiment, an eMBB transport block may include four CBs without CB level interleaving, as illustrated in FIG. 5.

A fourth communication 414 may include a message transmitted from the gNB 404 to the first UE 402 to schedule UL resource for eMBB traffic. The message may be transmitted by physical layer control signaling. In one embodiment, the message includes the resource granularity shaping index field of '00' and resources are allocated for concatenated coding blocks.

A fifth communication 416 may include messages sent from the second UE 404 to the gNB 406. Specifically, in response to URLLC traffic arriving driven by a service running in the second UE 404, the second UE 404 may begin grant-free transmission and choose the resource granularity shaping and opportunities that are configured by the second communication 410. In certain embodiments, the transmission starting opportunity may have a property that an overlapping resource between eMBB and URLLC impacts no more than one CB of eMBB, which may also be configured by the second communication 410.

In certain embodiments, the gNB 406 may decode eMBB CBs and then TBs with the pre-knowledge of the potential presence of URLLC transmission in a grant-free manner. In various embodiments, the gNB 406 may first prioritize the demodulation and decoding of the URLLC traffic, then prioritize the eMBB CBs without interference from URLLC traffic, and then prioritize the eMBB CBs possibly interfered by URLLC packet. In some embodiments, the eMBB transmission from the first UE 402 may be URLLC transmission, with a latency requirement that is more relaxed than the URLLC transmission from the second UE 404. It should be noted that a resource granularity shaping framework may apply to UL, DL, and/or UL control channel. As the requirement for UL control channel in different scenarios may be different, the UL control channel format used by a certain service may also be flexibly defined and triggered.

In another example, UL control channels with different resource granularity shaping options and waveform options may be used. Depending on the application and intended to function to be performed, different UL control channel shaping may carry different type of UCIs.

In certain embodiments, the gNB 406 may configure 2 UL control channel resource granularity shaping options via RRC signaling, as illustrated in Table 2. The granularity shaping index '0' represents a relatively longer duration and narrower bandwidth with DFTS-OFDM waveform and may have better coverage performance than the granularity shaping index '1'. In addition, the granularity shaping index '0' may be friendlier to a DL eMBB service because the UCI may be feedback in a longer interval (e.g., the whole slot duration in FIG. 2 may be too long to support eMBB traffic and the UL control part may have a long enough duration to achieve better energy accumulation for better UL control channel performance). On the other hand, the granularity shaping index '1' may be applicable to scenarios that require short latency.

TABLE 2

| Granularity Shaping Index | Time Domain Duration | Frequency Domain Bandwidth | Subcarrier Spacing | Waveform |
| --- | --- | --- | --- | --- |
| 0 | 4 Symbols | 36 Subcarriers | 15 kHz | DTFS-OFDM |
| 1 | 1 Symbol | 144 Subcarriers | 30 kHz | OFDM |

In one embodiment, the first UE 402 may be scheduled with DL eMBB traffic with high data rate. The slot duration used for scheduling the first UE 402 may be quite long which is achieved by slot-aggregation. The UCI (e.g., including HARQ ACK/NACK, CSI, etc.) transmitted in the UL symbols may use the granularity shaping index '0' in Table 2 and the indication to use the granularity shaping index '0' may be delivered to the first UE 402 in DL physical layer control signaling.

During a DL eMBB transmission for the first UE 402, the first UE 402 may be scheduled with a one-shot URLLC DL packet generated by a low latency service. In this case, the gNB 406 may indicate to the first UE 402 the usable UL control channel resource granularity or may indicate to the first UE 402 to use the granularity shaping index '1' via physical layer control signaling, which may be used to carry ACK/NACK feedback.

After decoding the URLLC packet from the gNB 406, the first UE 402 may provide feedback ACK/NACK according to the indication from the gNB 406 relating to resource location and channel resource granularity. If the indicated resource overlaps and/or collides with the resource used by UCI of DL eMBB traffic, the first UE 402 may choose to postpone, puncture, and/or rate match around the resource when mapping the UCI for DL eMBB traffic. Thus, the behavior of the first UE 402 may be aligned with the gNB 406.

After receiving ACK from the first UE 402, the gNB 406 may proceed with a URLLC high layer procedure to accomplish an air interface procedure as soon as possible to achieve low end to end latency. In some embodiments, the multiplexing between UL control channel for URLLC and eMBB may also happen for two different UEs (e.g., the first UE 402 and the second UE 404). The procedures may be substantially the same for the two different UEs. In certain embodiments, the adjustment of the UCI mapping for eMBB may depend on whether the eMBB UE can acquire the URLLC scheduling and ACK/NACK feedback related information.

In various embodiments, resource granularity candidates may include information for communication: without CB interleaving, with CB interleaving, via DL, via UL, via TDD, via FDD, and/or via UL control channel.

Figure 6:
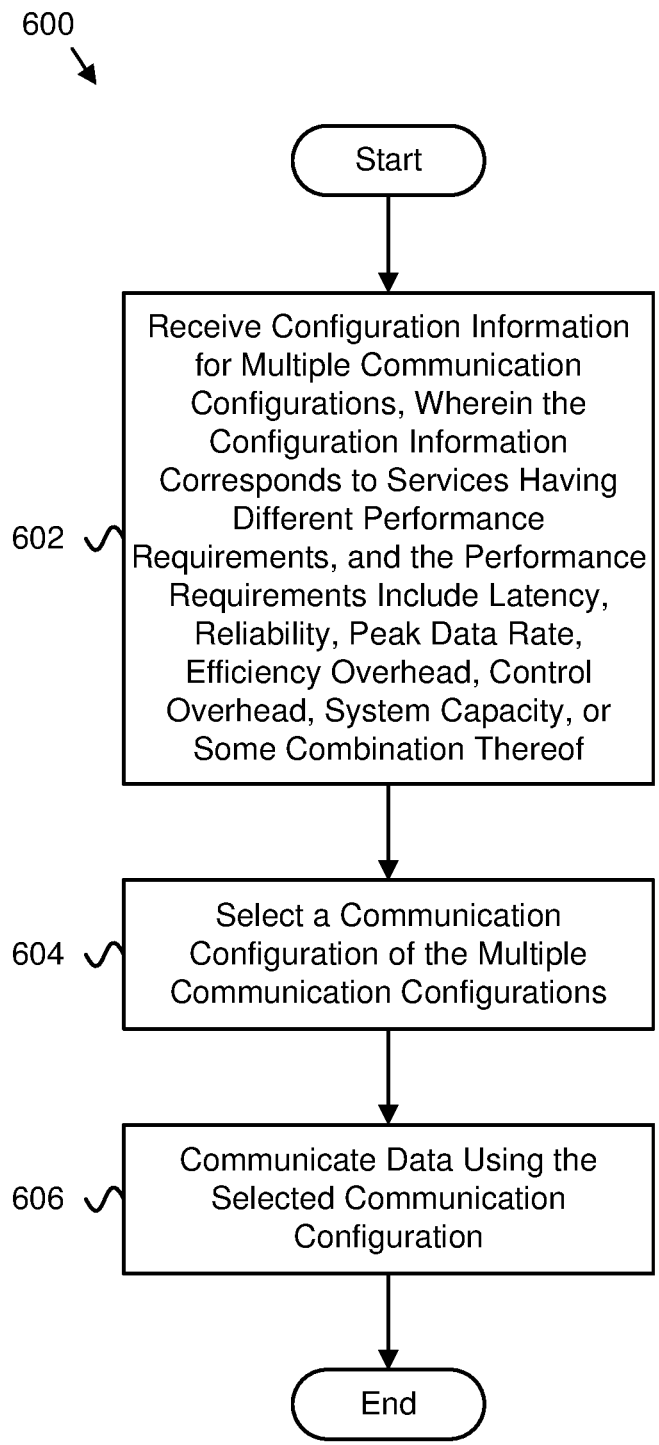
FIG. 6 is a schematic flow chart diagram illustrating one embodiment of a method for communication configuration selection.

FIG. 6 is a schematic flow chart diagram illustrating one embodiment of a method 600 for communication configuration selection. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 configuration information for multiple communication configurations (e.g., such as shown in Tables 1 and 2). The configuration information may correspond to services (e.g., eMBB, URLLC, MMC) having different performance requirements, and the performance requirements may include latency, reliability, peak data rate, efficiency overhead, control overhead, system capacity, or some combination thereof. The method 600 also includes selecting 604 a communication configuration of the multiple communication configurations. In one embodiment, the method 600 includes communicating 606 (e.g., transmitting and/or receiving) data using the selected communication configuration.

In one embodiment, the configuration information includes a time duration, a frequency bandwidth, a subcarrier spacing, a waveform, a reference signal pattern, a cyclic prefix overhead setting, or some combination thereof for each communication configuration of the multiple communication configurations. In a further embodiment, the method 600 includes receiving the configuration information via signaling (e.g., RRC signaling). In certain embodiments, the method 600 includes receiving resource information corresponding to the communication configuration. In some embodiments, the multiple communication configurations include communication configurations selected from the group including enhanced mobile broad band, ultra reliable and low latency communication, and massive machine type communication.

In various embodiments, the method 600 includes receiving selection information via signaling for selecting the communication configuration. In some embodiments, the method 600 includes dynamically selects the communication configuration. In one embodiment, the communication configuration includes an uplink communication configuration corresponding to an uplink control channel, an uplink data channel, or some combination thereof. In a further embodiment, the communication configuration includes a downlink communication configuration corresponding to a downlink control channel, a downlink data channel, or some combination thereof. In various embodiments, the configuration information includes a resource allocation configuration, a transmission mode configuration, or some combination thereof.

Figure 7:
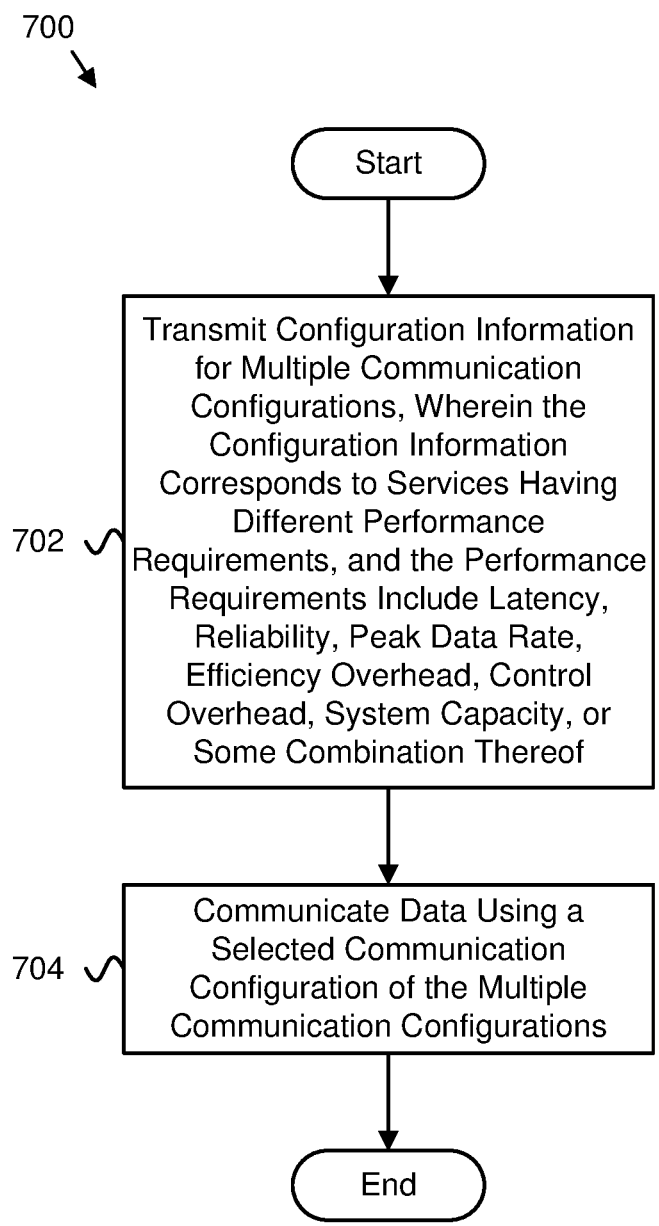
FIG. 7 is a schematic flow chart diagram illustrating another embodiment of a method for communication configuration selection.

FIG. 7 is a schematic flow chart diagram illustrating one embodiment of a method 700 for communication configuration selection. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include transmitting 702 configuration information for multiple communication configurations (e.g., such as shown in Tables 1 and 2). In certain embodiments, the configuration information corresponds to services (e.g., eMBB, URLLC, MMC) having different performance requirements, and the performance requirements may include latency, reliability, peak data rate, efficiency overhead, control overhead, system capacity, or some combination thereof. The method 700 also includes communicating 704 (e.g., transmitting and/or receiving) data using a selected communication configuration of the multiple communication configurations.

In one embodiment, the configuration information includes a time duration, a frequency bandwidth, a subcarrier spacing, a waveform, a reference signal pattern, a cyclic prefix overhead setting, or some combination thereof for each communication configuration of the multiple communication configurations. In a further embodiment, the method 700 includes transmitting the configuration information via signaling. In certain embodiments, the method 700 includes transmitting resource information corresponding to the communication configuration. In some embodiments, the multiple communication configurations include communication configurations selected from the group including enhanced mobile broad band, ultra reliable and low latency communication, and massive machine type communication.

In various embodiments, the method 700 includes selecting the selected communication configuration. In some embodiments, the method 700 includes transmitting information indicating the selected communication configuration. In one embodiment, the communication configuration includes an uplink communication configuration corresponding to an uplink control channel, an uplink data channel, or some combination thereof. In a further embodiment, the communication configuration includes a downlink communication configuration corresponding to a downlink control channel, a downlink data channel, or some combination thereof. In various embodiments, the configuration information includes a resource allocation configuration, a transmission mode configuration, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a receiver that receives configuration information for a plurality of communication configurations, wherein:
the configuration information for each communication configuration of the plurality of communication configurations corresponds to a different service and comprises:
a different set of performance requirements; and
a frequency bandwidth and a subcarrier spacing; and
the performance requirements comprise latency, reliability, peak data rate, efficiency overhead, control overhead, system capacity, or some combination thereof;
a processor that applies a communication configuration of the plurality of communication configurations; and
a transmitter that communicates using the communication configuration.

2. The apparatus of claim 1, wherein the receiver receives the configuration information via signaling.

3. The apparatus of claim 1, wherein the receiver receives resource information corresponding to the communication configuration.

4. The apparatus of claim 1, wherein the receiver receives selection information via signaling for applying the communication configuration.

5. The apparatus of claim 1, wherein the communication configuration comprises an uplink communication configuration corresponding to an uplink control channel, an uplink data channel, or some combination thereof.

6. The apparatus of claim 1, wherein the communication configuration comprises a downlink communication configuration corresponding to a downlink control channel, a downlink data channel, or some combination thereof.

7. The apparatus of claim 1, wherein the configuration information comprises a resource allocation configuration, a transmission mode configuration, or some combination thereof.

8. A method comprising:
receiving configuration information for a plurality of communication configurations, wherein:
the configuration information for each communication configuration of the plurality of communication configurations corresponds to a different service and comprises:
a different set of performance requirements; and
a frequency bandwidth and a subcarrier spacing; and
the performance requirements comprise latency, reliability, peak data rate, efficiency overhead, control overhead, system capacity, or some combination thereof; and
applying a communication configuration of the plurality of communication configurations; and
communicating using the communication configuration.

9. The method of claim 8, further comprising receiving the configuration information via signaling.

10. The method of claim 8, further comprising receiving resource information corresponding to the communication configuration.

11. The method of claim 8, further comprising receiving selection information via signaling for applying the communication configuration.

12. The method of claim 8, wherein the communication configuration comprises an uplink communication configuration corresponding to an uplink control channel, an uplink data channel, or some combination thereof.

13. The method of claim 8, wherein the communication configuration comprises a downlink communication configuration corresponding to a downlink control channel, a downlink data channel, or some combination thereof.

14. The method of claim 8, wherein the configuration information comprises a resource allocation configuration, a transmission mode configuration, or some combination thereof.

15. An apparatus comprising:
a transmitter that transmits configuration information for a plurality of communication configurations, wherein:
the configuration information for each communication configuration of the plurality of communication configurations corresponds to a different service and comprises:
a different set of performance requirements; and
a frequency bandwidth and a subcarrier spacing; and
the performance requirements comprise latency, reliability, peak data rate, efficiency overhead, control overhead, system capacity, or some combination thereof; and
a receiver that communicates using the communication configuration.

16. The apparatus of claim 15, wherein the transmitter transmits the configuration information via signaling.

17. The apparatus of claim 15, wherein the transmitter transmits resource information corresponding to the communication configuration.

18. The apparatus of claim 15, further comprising a processor that selects the communication configuration.

19. The apparatus of claim 18, wherein the transmitter transmits information indicating the selected communication configuration.

20. The apparatus of claim 15, wherein the communication configuration comprises an uplink communication configuration corresponding to an uplink control channel, an uplink data channel, or some combination thereof.

\* \* \* \* \*